United States Patent [19]

Kasuga et al.

[11] Patent Number: 4,571,364
[45] Date of Patent: Feb. 18, 1986

[54] MAGNETIC RECORDING MEDIUM

[75] Inventors: Akira Kasuga; Akihiro Matsufuji; Yasuyuki Yamada; Nobuo Tsuji, all of Kanagawa, Japan

[73] Assignee: Fuji Photo Film Co., Ltd., Kanagawa, Japan

[21] Appl. No.: 649,326

[22] Filed: Sep. 10, 1984

[30] Foreign Application Priority Data

Sep. 8, 1983 [JP] Japan .................. 58-165403

[51] Int. Cl.⁴ .............................. G11B 5/70
[52] U.S. Cl. ............................. 428/336; 252/62.54;
360/134; 360/135; 360/136; 427/128;
428/425.9; 428/328; 428/329; 428/694;
428/900; 428/522
[58] Field of Search ............. 428/694, 900, 328, 403,
428/405, 407, 425.9, 695, 336, 522, 329;
427/128; 252/62.54; 360/134–136

[56] References Cited

U.S. PATENT DOCUMENTS

| | | | |
|---|---|---|---|
| 3,840,400 | 10/1974 | Yamada | 428/425.9 |
| 4,152,485 | 5/1979 | Mizumura | 428/425.9 |
| 4,286,022 | 8/1981 | Vermillion | 428/425.9 |
| 4,328,282 | 5/1982 | Lehner | 428/425.9 |
| 4,368,238 | 1/1983 | Somezawa | 428/694 |
| 4,404,253 | 9/1983 | Kohler | 428/425.9 |
| 4,407,901 | 10/1983 | Miyatsuka | 428/694 |
| 4,411,957 | 10/1983 | Tokuda | 428/425.9 |
| 4,521,486 | 6/1985 | Ninomiya | 428/694 |
| 4,529,661 | 7/1985 | Ninomiya | 428/694 |

Primary Examiner—Ellis P. Robinson
Attorney, Agent, or Firm—Sughrue, Mion, Zinn, Mackpeak and Seas

[57] ABSTRACT

A magnetic recording medium is described, comprising a non-magnetic support having provided thereon a magnetic layer comprising ferromagnetic particles dispersed in a binder, said ferromagnetic particles having a BET specific surface area of 25 $m^2/g$ or more, said binder comprising a modified polyurethane resin containing 0.1 meq/g or more of functional groups selected from carboxyl groups, hydroxyl groups, sulfonic acid groups, and epoxy groups, and containing at least three functional groups per molecule of the resin.

20 Claims, No Drawings

MAGNETIC RECORDING MEDIUM

FIELD OF THE INVENTION

The present invention relates to a magnetic recording medium, and more particularly to a magnetic recording medium using ferromagnetic fine particles useful of high density recording.

BACKGROUND OF THE INVENTION

It has been desired that magnetic recording media, particularly for audio cassette tapes, should have better frequency response, and better reproduction capability with respect to an original recorded sound, particularly for audio cassette tapes used for recording music, and that such audio cassette tapes should have better runnability and durability with the increase of car stereo, cassette deck installed in radio set, etc.

On the other hand, a magnetic recording media for video cassette tapes has been used for high density recording by shortening the recording wavelength or narrowing track width. Therefore, magnetic recording media having higher output, higher signal/noise (S/N) ratio, and better reproduction capability with respect to original recorded images has been desired. Also, with the increasing use of portable video tape recorders (VTR), magnetic recording tapes for VTR having much better running durability than conventional tapes are desired, while simultaneously it is desired to reduce the total thickness of the tapes, for example, to 20 μm or less.

In other words, audio tapes and video tapes having superior electromagnetic properties, running properties, and durability compared to conventional tapes, have been highly desired.

Various additives for the magnetic layer have been proposed, but such additives have not completely satisfied the desire for improvements as discussed above.

Research has been directed to a magnetic recording tape which is prepared by using ferromagnetic metal particles (i.e, a so-called "metal tape") to put such a product into practical use for video recording, because metal tape has higher recording density than the conventionally used iron oxide type recording tape. A system wherein a compact video tape recorder which uses a metal tape and which is associated with video camera has been proposed (*Rajio Gijutsu (Radio Technique)*, a special number, May, 1981). In comparison with the VHS system or Beta system which have been commercially practiced, this proposed system is designed to have higher than two times the recording density, about ½ of diameter of the head cylinder, and about ½ of the relative speed between a head and a tape. Accordingly, the recording wavelength in the system would be about half that of the VHS or Beta system, and is assumed to have 1μ or less (about 0.6μ).

This proposed system is required to provide an image quality at least equal to or higher than that of the VHS system and the Beta system in recording and reproducing under these conditions. Therefore, if image quality of this system is evaluated under the same conditions as that of a VHS system and a Beta system, +6 dB or more of C/N ratio (that is, the ratio of an output or reproduced signals/modulation noise at recording FM carrying wave) higher than that of the VHS system or Beta system is required.

For a magnetic recording medium to satisfy the foregoing requirements, certain conditions must be met, but meeting such condition involves various problems.

For instance as the recording wavelength becomes shorter, it is required to increase coercive force (Hc) of a tape to some extent. Also, the surface of a magnetic recording layer must be made as smooth as possible to minimize a spacing loss between the magnetic head and the magnetic recording layer. For the purpose, the degree of dispersibility of the ferromagnetic particles must be increased and a calendering treatment must be carried out to make the surface of a magnetic recording layer smooth. These are also effective in decreasing noise.

Further, it is very effective and important to make the particle size of the ferromagnetic particles smaller in order to increase recording density of a magnetic recording medium. However, when the particle size is made smaller, problems occur, such as (1) that the dispersibility of the magnetic particles is deteriorated, whereby a magnetic layer having a smooth surface useful for short wavelength recording can not be obtained; (2) that durability of the magnetic recording layer is decreased, whereby head clogging reasily occurs in a still mode use of VTR; (3) that as the tape is running, output is decreased; and (4) that wear resistance is deteriorated, whereby the surface of the magnetic layer is scraped away by a magnetic head.

A magnetic layer is coated on a support, such as a polyester film, with a magnetic coating composition containing ferromagnetic particles, a binder, and organic solvents and other additives. The binder, which is the main component of the magnetic coating composition for the magnetic layer, must be selected from those that have excellent durability and wear-resistance. Various resins, such as a vinyl chloride-vinyl acetate resin, a cellulose derivative, and a polyurethane resin have been proposed as binders which meet the above requirements (U.S. Pat. Nos. 4,152,484 and 3,630,771). However, those binders do not have completely satisfactory characteristics.

SUMMARY OF THE INVENTION

As a result of extensive research, it has now been found that satisfactory effect can be obtained by using ferromagnetic particles having a particular BET specific surface area and a particular modified polyurethane resin in combination.

That is, the objects of the present invention include providing a magnetic recording medium having better durability and having improved dispersibility of the ferromagnetic particles.

The above objects can be attained by a magnetic recording medium comprising a non-magnetic support and a magnetic layer provided thereon having ferromagnetic particles dispersed in a binder, said ferromagnetic particles having BET specific surface area of 25 m$^2$/g or more, and said binder comprising a modified polyurethane resin containing 0.1 meq/g or more of functional groups selected from carboxyl groups, hydroxyl groups, sulfonic acid groups and epoxy groups, and containing at least three functional groups per molecule of the resin.

DETAILED DESCRIPTION OF THE INVENTION

The ferromagnetic particles which are used in the present invention are selected from magnetic particles of oxides such as $\gamma$-$Fe_2O_3$, Co-$\gamma$-$Fe_2O_3$, $Fe_3O_4$ or $CrO_2$, and magnetic fine metal particles such as Fe, Co, or Ni, or alloy particles containing one or more of said metals, and having a BET specific surface area of 25 $m^2/g$ or more. Magnetic fine metal particles such as Fe-Co-Ni alloy particle and Fe-Co alloy particles are preferably used.

It is necessary that a modified polyurethane resin used in the present invention has 0.1 meq/g or more, preferably 0.2 to 1.0 meq/g, of polar functional groups selected from a carboxyl group, a hydroxyl group, a sulfonic acid group or an epoxy group, preferably a hydroxyl group or a sulfonic acid group, and has at least 3, and preferably 5 or more, functional groups per molecule of the resin. The average molecular weight is generally from 5,000 to 100,000, and preferably from 8,000 to 60,000. Conventionally used thermoplastic polyurethane resin has a hydroxyl group only at the terminal of the molecule, while the modified polyurethane resin of the present invention also has polar functional groups in the molecular chain. Therefore, the polyurethane resin is easily adsorbed on the fine magnetic particles and wetting is accelerated, thereby improving the dispersibility of the magnetic particles.

The most suitable modified polyurethane resin containing hydroxyl groups is an epoxy modified polyurethane resin containing at least 3, and preferably 5 or more, functional groups for molecule of the resin, which has 0.1 meq/g or more of hydroxyl groups which are formed by opening the epoxy rings with amines and/or carboxylic acids. A preferred epoxy resin component is represented by formula (I).

The modified urethane resins used in the present invention are not limited to the above described examples.

Conventional thermoplastic resins, thermosetting resins, reactive resins, and mixtures thereof can be also used with the modified polyurethane resin in the present invention.

The thermoplastic resins used in the present invention have a softening point of 150° C. or lower, the average molecular weight of 10,000 to 200,000 and the degree of polymerization of about 100 to 1000. Specific examples are a copolymer of vinyl chloride-vinyl acetate, a copolymer of vinyl chloride-vinylidene chloride, a copolymer of vinyl chloride-acrylonitrile, a copolymer of acrylate-acrylonitrile, a copolymer of acrylate-vinylidene chloride, a copolymer of acrylate-styrene, a copolymer of methacrylate-acrylonitrile, a copolymer of methacrylate-vinylidene chloride, a copolymer of methacrylate-styrene, an urethane elastomer, a polyvinyl fluoride, a copolymer of vinylidene chloride-acrylonitrile, a copolymer of butadiene-acrylonitrile, a polyamide resin, polyvinyl butyral, a cellulose derivative (e.g., cellulose acetate butyrate, cellulose diacetate, cellulose triacetate, cellulose propionate, nitrocellulose, etc.), a copolymer of styrene-butadiene, a polyester resin, various synthetic rubber type thermoplastic resins (e.g., polybutadiene, polychloroprene, polyisoprene, styrene-butadiene copolymer, etc.), and mixtures thereof. Vinyl chloride-vinyl acetate type copolymers are preferably used in combination with the modified polyurethane resin.

A molecular weight of thermosetting resins or reactive resins is 200,000 or less in a coating composition and becomes essentially infinite by the reaction such as condensation or addition reaction after coating and drying. Of those resins, resins which do not soften or melt until they are heat-decomposed are preferred. Specific examples are a phenol.formalin-novolak resin, phenol.formalin-resol resin, a phenol.formalin-novolak resin, phenol.formalin-resol resin, a phenol.furfural resin, a xylene.formaldehyde resin, a urea resin, a melamine resin, a drying oil modified alkyd resin, a phenol modified alkyd resin, a maleic acid modified alkyd resin, an unsaturated polyester resin, an epoxy resin and a hardening agent (e.g., polyamine, acid anhydride, a polyamide resin, etc.), a moisture-curable polyester resin having isocyanate groups at the terminal, a moisture-curable polyether resin having isocyanate groups at the terminal, a mixture of a polyisocyanate prepolymer (a compound which is obtained by the reaction of diisocyanate and triol having a low molecular weight and which has at least three isocyanate groups in the molecule, a trimer or a tetramer of diisocyanate) and a resin having an active hydrogen (e.g., polyester polyol, polyether polyol, a copolymer of acrylic acid, a copolymer of maleic acid, a copolymer of 2-hydroxyethyl methacrylate, a copolymer of p-hydroxystyrene, etc.), and mixtures thereof.

Into the magnetic coating composition can be added lubricating agents, abrasives, and dispersing agents,

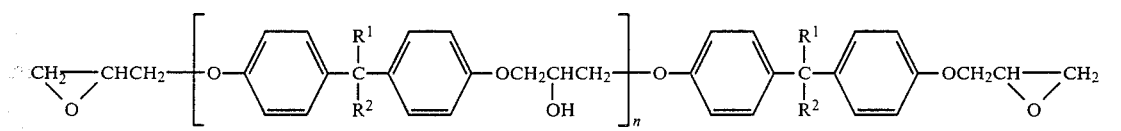

(I)

wherein $R^1$ and $R^2$ each represents a hydrogen or a methyl group and n is a number of 0.1 or more.

Particularly, the hydrolysis resisting property and the hardness of the coated layer of a magnetic tape can be adjusted by the bisphenol skeleton structure. If the functional group is contained in an amount of less than 0.1 meq/g, magnetic fine particles can not be well dispersed, and accordingly, the object of the present invention can not be achieved.

A modified polyurethane resin containing carboxyl groups includes a polyurethane modified by lysine or a lysine salt (lysine alkali salt and lysinate of an organic cation); a polyurethane modified by a compound represented by formula (II).

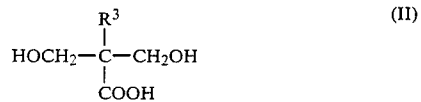

(II)

wherein $R^3$ is an alkyl group having from 1 to 6 carbon atoms; and a polyurethane modified by 2-hydroxypropanediol-1,3 or carboxylate thereof. Methods for modifying polyurethanes by lysine or 2-carboxypropane diols are disclosed in Japanese Patent Publications Nos. 15517/71 and 38760/78. Other modification methods are also disclosed in Japanese Patent Publication No. 41607/80 and U.S. Pat. No. 4,096,127.

antistatic agents and rust-preventing agents, if desired. The resulting coating composition is coated on a non-magnetic support to prepare a magnetic recording medium of the present invention.

Methods for preparing magnetic coating compositions are disclosed in detailed, for example, in Japanese Patent Publication Nos. 11162/73, 21331/73, 33683/73, and in U.S. Pat. Nos. 3,240,621, 3,526,598, 3,728,262, 3,790,407 and 3,836,393.

An amount of the binder is preferably from 8 to 25 parts by weight per 100 parts by weight of ferromagnetic fine particles, and an amount of the modified polyurethane resin contained in the binder is generally from 10 to 60 % by weight preferably from 25 to 50% by weight, more preferably from 30 to 40% by weight, based on the total weight of the binder. The dry thickness of the magnetic layer is preferably from 0.5 to 6$\mu$.

Lubricants include silicon oil such as various polysiloxane; inorganic particles such as graphite, molybdenum disulfide or tungsten disulfide; plastic fine particles such as polyethylene or polytetrafluoroethylene; fatty acids having long chains; fatty acid esters; and fluorocarbons; which are used in an amount of from 0.2 to 20 parts by weight per 100 parts by weight of the binder.

Abrasives include fused alumina, silicon carbide, chrome oxide ($Cr_2O_3$), corundum, and diamond having an average diameter of from 0.05 to 5$\mu$; which is used in an amount of from 0.5 to 20 parts by weight per 100 parts by weight of the binder.

The above composition is homogeneously mixed with organic solvents such as ketones (e.g., methyl ethyl ketone, or cyclohexanone), alcohols, esters (e.g., ethyl acetate or butyl acetate), aromatic solvents (e.g., benzene, toluene, or xylene), or chlorinated hydrocarbons (e.g., carbon tetrachloride or chloroform). Thus prepared coating composition is coated on a non-magnetic support.

Non-magnetic supports include a synthetic resin (e.g., polyester, vinyl type polymer or cellulose derivative), non-magnetic metal or a paper. The shape can be a film, a tape or a sheet.

The magnetic layer coated on a support is subjected to orientation, dried, and can be subjected to smoothing treatment to improve magnetic properties such as C/N (e.g., a smoothing treatment before drying or a calendering treatment after drying).

Magnetic particles, organic solvents and various additives such as a dispersing agent, a lubricant, an abrasive or an antistatic agent which are used if desired are not particularly be limited, and those conventionally used can be used in the practice of the present invention.

The present invention is illustrated in more detail by the following Examples and Comparative Examples. All parts are by weight.

EXAMPLE 1

| | |
|---|---|
| (A) Ferromagnetic fine metal particles (weight ratio: Fe/Ni = 89/11, specific surface area 50 $m^2$/g) | 300 parts |
| (B) Epoxy modified polyurethane resin (hydroxyl group 0.5 meq/g, average molecular weight 13,000, number of hydroxyl groups 6.5) | 30 parts |
| (C) Copolymer of vinyl chloride-vinyl acetate-maleic anhydride (weight ratio 38:16:1) | 35 parts |
| (D) Dimethyl polysiloxane (degree of polymerization: about 60) | 2 parts |
| (E) n-Butyl acetate | 300 parts |
| (F) Methyl ethyl ketone | 300 parts |

The above composition was mixed, kneaded and dispersed for 10 hours. To the dispersion was added 22 parts of a 75 wt % ethyl acetate solution of a triisocyanate compound ("Desmodule L-75"manufactured by Bayer A.G., an adduct of 3 moles of tolylene diisocyanate and 1 mole of trimethylol propane, molecular weight: 656, NCO content: 13.3 wt %) and dispersed by high speed shearing force for 1 hour to prepare a magnetic coating composition.

The resulting coating composition was coated on one surface of a polyethylene terephthalate film having a thickness of 14$\mu$ in a dry thickness of 5$\mu$, followed by drying, smoothing treatment using a super-calender role, and then was slit to a width of $\frac{1}{2}$ inch to prepare a metal tape for video recording. This tape was designated Sample A.

EXAMPLE 2

| | |
|---|---|
| (A) Ferromagnetic metal fine particles (the same as those in Example 1) | 300 parts |
| (B) Epoxy modified polyurethane resin (hydroxy group: 0.6 meq/g, molecular weight: 11,000, number of hydroxyl groups: 6.6) | 30 parts |
| (C) Copolymer of vinyl chloride-vinyl acetate-maleic anhydride (weight ratio 83:16:1) | 35 parts |
| (D) Dimethyl polysiloxane (degree of polymerization: about 60) | 2 parts |
| (E) n-Butyl acetate | 300 parts |
| (F) Methyl ethyl ketone | 300 parts |

The above composition was treated in the same manner as in Example 1 to prepare a metal tape for video recording. Four kinds of metal tapes for video recording were prepared in the same manner as in Example 1, except that the specific surface area of the magnetic particles were changed, as shown in Table 1. The thus-obtained tapes were designated as Samples B, C, D, and E, respectively.

EXAMPLE 3

| | |
|---|---|
| (A) Co—$\gamma$-$Fe_2O_3$ (Co content: 3 atm %, Hc: 630 Oe, specific surface area: 29 $m^2$/g) | 300 parts |
| (B) Copolymer of vinyl chloride-vinyl acetate-vinyl alcohol (weight ratio 83:13:4) | 28 parts |
| (C) Modified polyurethane resin containing carboxyl groups (carboxyl group content: 0.5 meq/g, average molecular weight: 27,000, number of carboxyl groups: 13.5) | 25 parts |
| (D) Electroconductive carbon black | 18 parts |
| (E) Oleic acid | 3 parts |
| (F) Palmitic acid | 1 part |
| (G) Mixed solvent of methyl ethyl ketone/toluene | 700 parts |

The above composition was completely mixed and dispersed in a ball mill. To the dispersion, 8 parts of a 75 wt % ethyl acetate solution of a triisocyanate compound which is an adduct of 3 moles of tolylene diisocyanate and 1 mole of trimethylol propane ("Desmodule L-75" manufactured by Bayer A.G.) and 180 parts of the above-described mixing solvent of methyl ethyl ketone and toluene were added and completely mixed to prepare a magnetic tape in the same manner as in Example 1. The thus-obtained tape was designated Sample F. The modified polyurethane resin containing a carboxyl group was prepared in the same manner as in Example 1 as disclosed in Japanese Patent Publication No. 38760/78.

EXAMPLE 4

The same procedure as in Example 3 was repeated except that a modified polyurethane resin containing a sulfonic acid group (content of a sulfonic acid group: 0.6 meq/g, average molecular weight: 13,000, number of a sulfonic acid group: 7.8) was used instead of the component (C) in Example 3 to prepare a magnetic tape. The tape was designated Sample G.

EXAMPLE 5

The same procedure as in Example 1 was repeated except that a modified polyurethane resin containing an epoxy group (content of an epoxy group: 0.6 meq/g, average molecular weight: 13,000, number of an epoxy group: 7) was used instead of the component (B) of an urethane resin in Example 1 to prepare a magnetic tape. The tape was designated Sample H.

COMPARATIVE EXAMPLE 1

The same procedure as in Example 1 was repeated except that a polyurethane resin containing hydroxyl groups only at the terminals of the molecular chain ("Estane 5701", manufactured by Goodrich Co., Ltd.) was used instead of the epoxy modified polyurethane resin used in Example 1 to prepare a metal tape for video recording. The thus-obtained tape was designated Sample I.

COMPARATIVE EXAMPLE 2

The same procedure as in Example 2 was repeated using ferromagnetic particles having the same specific surface area as that of Sample C except that the polyurethane resin used in Comparative Example 1 was used to prepare a metal tape for video recording. The thus-obtained tape was designated Sample J.

COMPARATIVE EXAMPLE 3

The same procedure as in Example 3 was repeated except that a polyurethane resin having hydroxyl groups only at the terminals of the molecular chain ("Crysbon 7209", manufactured by Dainippon Ink Co., Ltd.) was used instead of the component (C) in Example 3 to prepare the magnetic tape. The thus-obtained tape was designated Sample K.

COMPARATIVE EXAMPLE 4

The same procedure as in Example 1 was repeated except that an epoxy modified polyurethane resin (content of hydroxyl groups: 0.2 meq/g, average molecular weight: 10,000, average number of hydroxyl groups in the molecule: 2) was used to prepare the magnetic tape. The thus-obtained tape was designated Sample L.

COMPARATIVE EXAMPLE 5

The same procedure as in Example 3 was repeated except that ferromagnetic particles having a specific surface area of 20 $m^2/g$ was used to prepare a magnetic tape. The thus-obtained tape was designated Sample M.

COMPARATIVE EXAMPLE 6

The same procedure as in Comparative Example 3 was repeated except that ferromagnetic particles having specific surface area of 20 $m^2/g$ was used to prepare a magnetic tape. The thus obtained tape was designated Sample N.

Surface gloss and durability were evaluated for each tape for video recording which was obtained from each of the Examples and Comparative Examples. The results thereof are shown in Table 1.

The evaluations shown in Table 1 below were carried out in the following manner.

(a) Gloss:

The value of gloss is that measured before each sample was subjected to a super-calendering treatment and is shown in terms of % of reflective light at 45°.

(b) Still Life:

Replaying was carried out at a still mode use at 5° C. and the time (min) for the marked defect to appear on the surface of VTR was measured, using a "NV-6600 type" apparatus manufactured by Matsushita Electric Industries Co., Ltd.

(c) Decrease of Output Level:

The decrease of the output level of a tape which had been running for 10 hours at 30° C., 80% RH, was measured, and is shown by dB.

TABLE 1

| | Sample | Specific surface area of ferromagnetic metal particles ($m^2/g$) | Gloss | Durability Still life (min) | Durability Level decrease (dB) |
| --- | --- | --- | --- | --- | --- |
| Example 1 | A | 50 | 60 | 45 | 0.6 |
| Example 2 | B | 25 | 45 | 84 | 0.2 |
| | C | 30 | 50 | 62 | 0.3 |
| | D | 40 | 55 | 54 | 0.3 |
| | E | 60 | 60 | 40 | 0.7 |
| Example 3 | F | 29 | 48 | 68 | 0.3 |
| Example 4 | G | 29 | 47 | 58 | 0.2 |
| Example 5 | H | 50 | 58 | 51 | 0.4 |
| Comparative Example 1 | I | 50 | 35 | 25 | 1.4 |
| Comparative Example 2 | J | 30 | 30 | 37 | 1.2 |
| Comparative Example 3 | K | 29 | 31 | 18 | 1.8 |
| Comparative Example 4 | L | 50 | 35 | 22 | 2.0 |
| Comparative Example 5 | M | 20 | 26 | 38 | 0.3 |
| Comparative Example 6 | N | 20 | 24 | 33 | 0.4 |

It is clear from the results shown in Table 1 that the tape for video recording of the present invention has superior surface gloss and superior surface property to the tapes using the conventional polyurethane (as shown in Comparative Examples 1, 2, 3 and 4). Further it is seen that the larger the specific surface area becomes, i.e., the smaller the particle size is, the more the surface property of ferromagnetic particles is improved. It is believed that this is because the dispersibility of ferromagnetic particle is markedly improved by the modified polyurethane resin of the present invention. Using ferromagnetic particles having a small BET specific surface area (i.e., large particle size), Comparative Examples 5 and 6 used the same type of the binder as the present invention, and the same type of the conventional binder, respectively. Decrease of the output level was not so deteriorated but the surface gloss was deteriorated, and the surface property was not suitable for high density recording.

It is easily understood that durability at a still mode use on VTR (min.) and decrease of output (dB) of the tape while running are greatly improved by using the modified polyurethane resin of the present invention. There is a tendency that as the particle size becomes smaller, durability tends to deteriorate. Although the present invention has the same tendency, the durability of the present invention is much improved as compared to that of the tape using the conventional polyurethane resin.

Examples of the present invention used ferromagnetic metal particles and Co-$\gamma$-Fe$_2$O$_3$ as ferromagnetic particles. When other ferromagnetic particles are used, a magnetic tape using a modified polyurethane resin of the present invention as the binder substantially similar desirable results are obtained as described above.

It is found in the present invention that the effect is especially remarkable when ferromagnetic metal particles are used, and that a magnetic recording medium suitable for high density recording can be obtained thereby.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising ferromagnetic particles dispersed in a binder, said ferromagnetic particles having a BET specific surface area of 25 m$^2$/g or more, said binder comprising a modified polyurethane resin containing 0.1 meq/g or more of functional groups selected from carboxyl groups, hydroxyl groups, sulfonic acid groups, and epoxy groups, and containing at least three functional groups per molecule of the resin.

2. A magnetic recording medium as in claim 1, wherein the ferromagnetic particles are selected from magnetic particles of oxide selected from the group consisting of $\gamma$-Fe$_2$O$_3$, Co-$\gamma$-Fe$_2$O$_3$, Fe$_3$O$_4$ and CrO$_2$, and magnetic fine metal particles selected from the group consisting of Fe, Co, and Ni, and alloy particles containing one or more of said metals.

3. A magnetic recording medium as in claim 1, wherein the modified polyurethane resin has five or more functional groups per molecule of the resin and has a molecular weight of from 5,000 to 100,000.

4. A magnetic recording medium as in claim 2, wherein the modified polyurethane resin has five or more functional groups per molecule of the resin and has a molecular weight of from 5,000 to 100,000.

5. A magnetic recording medium as in claim 3, wherein the average molecular weight is from 8,000 to 60,000.

6. A magnetic recording medium as in claim 4, wherein the average molecular weight is from 8,000 to 60,000.

7. A magnetic recording medium as in claim 1, wherein the modified polyurethane resin is an epoxy modified polyurethane resin containing hydroxyl groups.

8. A magnetic recording medium as in claim 3, wherein the modified polyurethane resin is an epoxy modified polyurethane resin containing hydroxyl groups.

9. A magnetic recording medium as in claim 4, wherein the modified polyurethane resin is an epoxy modified polyurethane resin containing hydroxyl groups.

10. A magnetic recording medium as in claim 1, wherein the modified polyurethane resin is a polyurethane resin containing carboxyl groups.

11. A magnetic recording medium as in claim 3, wherein the modified polyurethane resin is a polyurethane resin containing carboxyl groups.

12. A magnetic recording medium as in claim 4, wherein the modified polyurethane resin is a polyurethane resin containing carboxyl groups.

13. A magnetic recording medium as in claim 1, wherein the binder is used in an amount of from 8 to 25 parts by weight per 100 parts by weight of ferromagnetic particles and the thickness of the magnetic layer is from 0.5 to 6$\mu$.

14. A magnetic recording medium as in claim 2, wherein the binder is used in an amount of from 8 to 25 parts by weight per 100 parts by weight of ferromagnetic particles and the thickness of the magnetic layer is from 0.5 to 6$\mu$.

15. A magnetic recording medium as in claim 3, wherein the binder is used in an amount of from 8 to 25 parts by weight per 100 parts by weight of ferromagnetic particles and the thickness of the magnetic layer is from 0.5 to 6$\mu$.

16. A magnetic recording medium as in claim 4, wherein the binder is used in an amount of from 8 to 25 parts by weight per 100 parts by weight of ferromagnetic particles and the thickness of the magnetic layer is from 0.5 to 6$\mu$.

17. A magnetic recording medium as in claim 7, wherein the binder is used in an amount of from 8 to 25 parts by weight per 100 parts by weight of ferromagnetic particles and the thickness of the magnetic layer is from 0.5 to 6$\mu$.

18. A magnetic recording medium as in claim 10, wherein the binder is used in an amount of from 8 to 25 parts by weight per 100 parts by weight of ferromagnetic particles and the thickness of the magnetic layer is from 0.5 to 6$\mu$.

19. A magnetic recording medium as in claim 1, wherein the binder contains 10 to 60% by weight of the modified polyurethane resin.

20. A magnetic recording medium as in claim 1, wherein the binder further comprises a vinyl chloride-vinyl acetate type copolymer.

* * * * *